W. KENNEDY.
UNIVERSAL COUPLING FOR ROLLS, &c.
APPLICATION FILED SEPT. 21, 1914.
1,139,124.
Patented May 11, 1915.
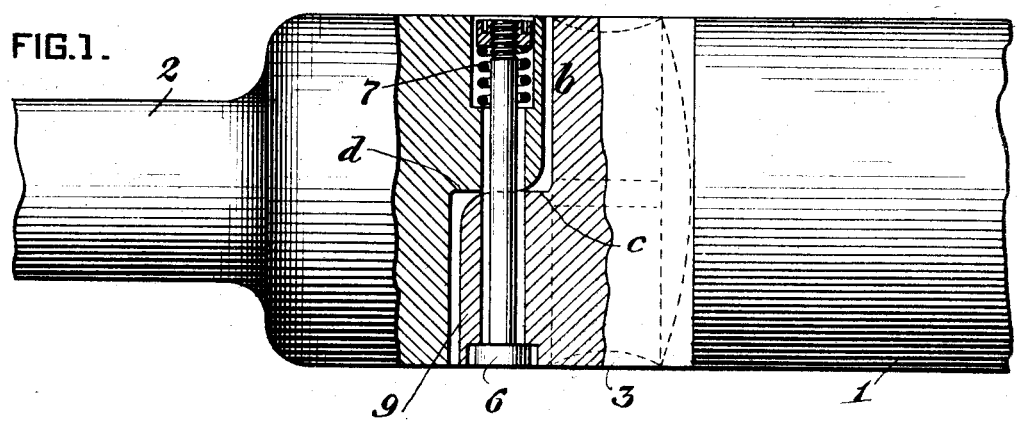
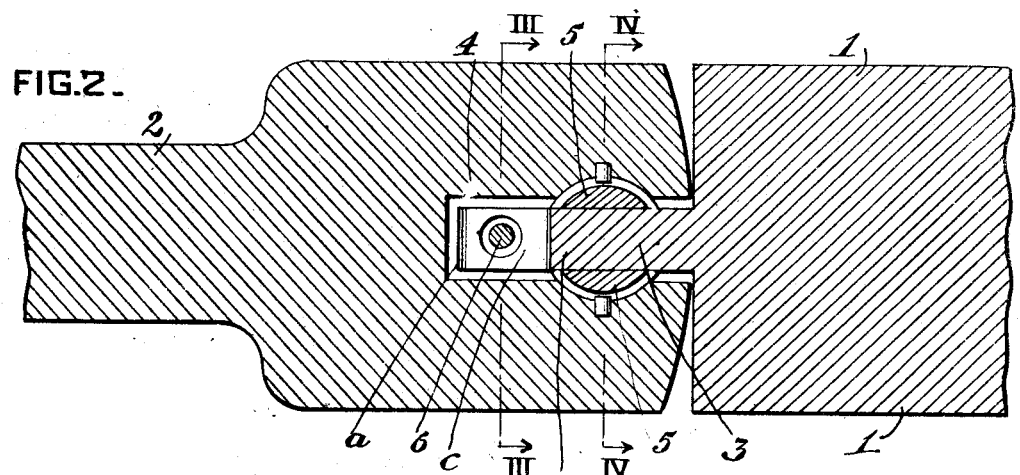
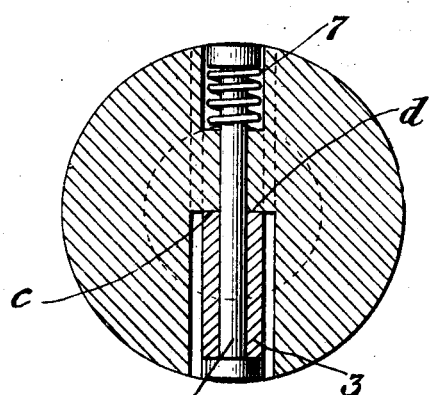
WITNESSES
INVENTOR

UNITED STATES PATENT OFFICE.

WALTER KENNEDY, OF PITTSBURGH, PENNSYLVANIA.

UNIVERSAL COUPLING FOR ROLLS, &c.

1,139,124.  Specification of Letters Patent.  Patented May 11, 1915.

Application filed September 21, 1914. Serial No. 862,679.

*To all whom it may concern:*

Be it known that I, WALTER KENNEDY, residing at Pittsburgh, in the county of Allegheny and State of Pennsylvania, a citizen of the United States, have invented or discovered certain new and useful Improvements in Universal Couplings for Rolls, &c., of which improvements the following is a specification.

The invention described herein relates to certain improvements in universal couplings which are especially adapted for use in connecting the respective ends of spindles or shafts to the driving pinions and rolls of a rolling mill.

The invention is hereinafter more fully described and claimed.

In the accompanying drawings, Figure 1 is a view partly in elevation and partly in section showing my improved coupling connecting the neck of a roll to its driving spindle or shaft; Fig. 2 is a similar view at right angles to Fig. 1; Figs. 3 and 4 are sectional views on planes indicated by the lines III—III and IV—IV respectively.

In the practice of my invention, the end of one of the parts *i. e.*, the driven part or roll 1 or the driving part or shaft 2 is provided with a diametrically arranged rib or block 3. As shown in Fig. 1 one half *a* of this rib or block extends a greater distance from its part or member, which in the construction shown is the neck of the roll, than the portion *b* thereby forming a shoulder *c*. In the other member of the connection, which in the construction shown is the shaft or spindle 2, is formed a slot or recess 4 extending diametrically across the end of the spindle. One half of this slot is made of a greater depth than the other half for the reception of the longer portion *a* of the rib 3, which when the coupling members are congregated projects into the slot so that the shoulder *c* will bear upon the shoulder *d* formed by the different depths of the portions of the slot as stated. By reference to Fig. 1 it will be observed that the different portions of the slot are deeper than the lengths of the portions *a* and *b* of the rib which project thereinto, so that the parts of the coupling may rock on the shoulders when such parts are moved out of alinement, said shoulders being rounded to permit of such relative movement.

In order that the parts of the coupling may move relatively one to the other in a direction at right angles to the rocking movement above described, the slot 4 is made of a width greater than that of the rib proportional to the desired relative movements of the parts of the coupling, and in order that the block or rib may have a solid lateral bearing on the sides of the slot and at the same time may be free to move to an angular position relative to the sides of the slot, shoes 5 having flat faces adapted to bear on the sides of the block or rib and curved surfaces, are fitted in curved seats formed in the side walls of the slot.

In order to hold the two parts of the coupling in operative relation a bolt 6 is passed through an opening in the part *b* of the block and the portion of the other coupling member which overlaps the part *b* as shown in Fig. 1. The holes through which the bolt 6 passes is made sufficiently larger than the latter, that there will not be any interference with the relative movements of the coupling members.

In order that the shoulders may be held in contact but with freedom of movement one on the other, a spring 7 is interposed between an abutment on the bolt and the bottom of the countersink through which one end of the bolt passes.

I claim herein as my invention;

1. A coupling comprising driving and driven rotatable parts one part having a block or rib extending therefrom and provided with a shoulder, and adapted to project into a slot in the other part, said part having a shoulder within said slot adapted to bear on the shoulder on the block or rib, said slot having a width greater than that of the block or rib, and rocking blocks arranged in the side walls of the slot and bearing on the sides of the block or rib, and means for holding the coupling members in engagement.

2. A coupling comprising driving and driven rotatable parts one part having a block or rib having portions extending different distances therefrom thereby forming a shoulder, the other part having a slot extending different depths thereinto thereby forming a shoulder in the bottom of the slot adapted to bear on the shoulder of the rib, rocking shoes interposed between the rib and the sides of the slot and a bolt passing through both parts of the coupling.

In testimony whereof, I have hereunto set my hand.

WALTER KENNEDY.

Witnesses:
ALICE A. TRILL,
THOS. B. JOYCE.